United States Patent
Prost et al.

(10) Patent No.: US 8,983,489 B2
(45) Date of Patent: Mar. 17, 2015

(54) METHOD FOR POSITIONING BY WI-FI SIGNALS

(75) Inventors: Jean-Baptiste Prost, Toulouse (FR); Baptiste Godefroy, Saint Sulpice sur Léze (FR); Stéphane Terrenoir, Toulouse (FR)

(73) Assignee: Pole Star SA, Toulouse (FR)

( * ) Notice: Subject to any disclaimer, the term of this patent is extended or adjusted under 35 U.S.C. 154(b) by 0 days.

(21) Appl. No.: 13/318,125

(22) PCT Filed: Apr. 28, 2010

(86) PCT No.: PCT/EP2010/055734
§ 371 (c)(1),
(2), (4) Date: Dec. 14, 2011

(87) PCT Pub. No.: WO2010/125113
PCT Pub. Date: Nov. 4, 2010

(65) Prior Publication Data
US 2012/0100870 A1    Apr. 26, 2012

(30) Foreign Application Priority Data
Apr. 30, 2009  (FR) ..................................... 09 52909

(51) Int. Cl.
*H04W 24/00* (2009.01)
*G01S 3/02* (2006.01)
*G01S 5/02* (2010.01)

(52) U.S. Cl.
CPC ...................................... *G01S 5/02* (2013.01)
USPC ..................... 455/456.1; 455/456.2; 342/457

(58) Field of Classification Search
CPC ...................................................... H04W 64/00
USPC ................................................... 455/456.1–6
See application file for complete search history.

(56) References Cited

U.S. PATENT DOCUMENTS 6,865,395 B2 *   3/2005   Riley .......................... 455/456.1
7,542,763 B2 *   6/2009   Russell ......................... 455/423
(Continued)

FOREIGN PATENT DOCUMENTS

| EP | 1 841 256 A | 10/2007 |
| WO | WO 00/75683 A | 12/2000 |
| WO | WO 2008/143497 | 11/2008 |

OTHER PUBLICATIONS

International Search Report for PCT/EP2010/055734, dated Sep. 20, 2010, in 3 pages.

(Continued)

*Primary Examiner* — William Nealon
(74) *Attorney, Agent, or Firm* — Knobbe Martens Olson & Bear LLP

(57) ABSTRACT

A method for positioning a terminal using signals received from a plurality of access points of at least one wireless telecommunications network is disclosed. According to some aspects, the terminal first retrieves identifiers of the access points from the received signals, then searches in a first database (BDP) for respective geographical position information for the access points. A first estimation of a position of the terminal or a positioning zone of the terminal is obtained from geographical position information of the access points, then topographical information corresponding to the first estimation of the position or the positioning zone is retrieved from a second database (SIG). A second estimation of the position of the terminal is performed using the topographical information thus obtained.

11 Claims, 3 Drawing Sheets

(56) References Cited

U.S. PATENT DOCUMENTS

| | | | |
|---|---|---|---|
| 8,089,400 B1* | 1/2012 | Fang et al. | 342/357.42 |
| 8,483,713 B2* | 7/2013 | Choi-Grogan | 455/456.2 |
| 2002/0039905 A1* | 4/2002 | Remy | 455/456 |
| 2002/0151314 A1* | 10/2002 | Nohara | 455/456 |
| 2002/0193941 A1* | 12/2002 | Jaeckle et al. | 701/207 |
| 2003/0146871 A1* | 8/2003 | Karr et al. | 342/457 |
| 2006/0240842 A1* | 10/2006 | Spain et al. | 455/456.1 |
| 2007/0142063 A1 | 6/2007 | Chiu et al. | |
| 2008/0129598 A1 | 6/2008 | Godefroy et al. | |
| 2009/0005083 A1* | 1/2009 | Hoshino et al. | 455/456.5 |
| 2009/0054076 A1* | 2/2009 | Evennou et al. | 455/456.1 |

OTHER PUBLICATIONS

3GPP, ETSI, 3GPP specification 43.059, http://www.3gpp.org/ftp/Specs/html-info/43059.htm, webpage printed on Feb. 23, 2012.

3GPP, ETSI, 3GPP specification 23.271, http://www.3gpp.org/ftp/Specs/html-info/23271.htm, webpage printed on Feb. 23, 2012.

Borriello, G., Chalmers, M., LaMarca, A. and Nixon, P., Delivering Real-World Ubiquitous Location Systems, Communications of the ACM, 48, (3), Mar. 2005, pp. 36-41.

Open Mobile Alliance Ltd., Secure User Plane Location Architecture, Candidate Version 1.0, Document Reference OMA-AD-SUPL-V1_0-20060127-C, Jan. 27, 2006, 80 pages.

* cited by examiner

METHOD FOR POSITIONING BY WI-FI SIGNALS

RELATED APPLICATIONS

This application is a U.S. National Phase of International Application No.: PCT/EP2010/055734, filed Apr. 28, 2010, which claims the benefit of French Patent Application No. 09 52909 filed Apr. 30, 2009, each of which is incorporated by reference in their entirety.

FIELD OF THE INVENTION

The present invention generally relates to the field of positioning systems using Wi-Fi signals combined or not combined with GNSS (Global Navigation Satellite System) signals.

BACKGROUND OF THE INVENTION

The very large majority of current navigation terminals use a satellite positioning system (SPS) such as GPS (Global Positioning System). Hereafter we will use the term "positioning" when a terminal determines its geographical position owing to signals it receives and, conversely, the term "localization" when the coordinates of a terminal are determined by the signals it emits.

In urban environment, the presence of buildings disturbs the propagation of satellite signals through occultation, reflection, attenuation and diffraction effects. Thus, the positioning performance of the SPS is damaged both in terms of availability and precision.

In order to resolve these drawbacks, it has been proposed to use the radiofrequency signals emitted by wireless telecommunications systems, widely used in urban areas, to determine the position of a mobile terminal. For example, the article by G. Boriello et al. entitled "Delivering real-world ubiquitous location systems," available at www.placelab.org/publications/, describes a positioning system (Place Lab project) using the signals emitted by the access points of a Wi-Fi network (IEEE 802.11). In that system, the terminal first scans the Wi-Fi access points within range and thereby obtains their MAC addresses as well as the respective powers or RSS (Received Signal Strength) of the received signals. The terminal then searches from those MAC addresses for the geographic positions of the access points and performs a barycentric weighting thereof with the powers in question to estimate its own position.

This positioning system is not, however, fully satisfactory inasmuch as the precision of the positioning is still insufficient. Furthermore, the calculated positions are sometimes absurd in that they can correspond to inaccessible zones, which damages the reliability of the system. Lastly, it requires viewing a database containing the list of access points and their respective geographic positions. The data can be collected collaboratively or in a centralized manner. In collaborative collection, individuals having portable Wi-Fi/GPS terminals provide, during their movement, their positions and their Wi-Fi scan results at those locations (MAC addresses and RSS levels). In a centralized collection, vehicles equipped with GPS receivers and Wi-Fi terminals criss-cross the zone to be mapped following a predetermined diagram to collect the MAC addresses and RSS levels. This collection strategy makes it possible to have complete coverage of the zone and to eliminate certain positioning artifacts created by a non-homogenous distribution of the access points inventoried in the database. The data collection, whether collaborative or centralized, is, however, a slow and expensive process. Furthermore, it must be done continuously or at regular intervals so as to update the access points.

The aim of the present invention is to propose a positioning system using the access points of a wireless telecommunications system that does not have the aforementioned drawbacks, in particular that improves the precision and reliability of the positioning. One subsidiary aim of the present invention is to propose a method for forming the database that is fast, effective and inexpensive.

SUMMARY AND DESCRIPTION OF ASPECTS OF THE INVENTION

The present invention is defined by a method for positioning a terminal using signals received from a plurality of access points of at least one wireless telecommunications network, comprising:
- a step for retrieving identifiers of said access points from the signals thus received;
- a step for searching in a first database (BDP) for geographical position information for said access points from their respective identifiers;
- a first step for estimating position information for the terminal from at least the geographical position information of said access points, said position information being the position of said terminal or a zone in which it is located, called positioning zone.

It also comprises:
- a step for retrieving, from a second database (SIG), topographical information relative to a zone around the position thus estimated or the positioning zone thus estimated;
- a second step for estimating the position of the terminal using the topographical information thus retrieved.

According to a first embodiment, the second estimating step comprises a weighting, using coefficients obtained from the topographical information thus retrieved, either of said position of the terminal and a second position obtained using a satellite positioning method, or measurements of signals received from the access points on the one hand and signal measurements of a satellite positioning system on the other hand.

According to one alternative of the first embodiment, the second estimating step comprises:
- a step for selecting, from the topographical information thus retrieved, among a first positioning method using signals received from said access points, a second positioning method using signals received from a satellite positioning system, or a third hybrid positioning method using both the first and second;
- a step for determining the position of the terminal using the method thus selected.

The step for selecting the positioning method can also use a time information from the terminal and parameters describing the orbits of the satellites of said positioning system.

The second database can advantageously comprise information for selecting the positioning method for a plurality of points of a geographical zone.

Alternatively, the second database can comprise, for each point of said plurality, said selection information associated with time information.

Advantageously, if the first positioning method is selected, the material and/or software means specific to the implementation of the second positioning method are put on standby and, if the second positioning method is selected, the material and/or software means specific to the implementation of the first positioning method are put on standby.

The first positioning method can be selected to determine the position of the terminal along a first axis and the second positioning method is selected to determine the position of the terminal along a second axis separate from the first.

According to a second embodiment, the terminal determines, from the topographical data of the second database, characteristics of the propagation channels between the detected access points and a plurality of points of said zone, and deduces therefrom, for each of said points, a theoretical power at each of those points.

The second estimating step can then advantageously determine the position of the terminal by searching, among said points, for the one that minimizes a cost function depending on the gap between the theoretical power at one point and the powers of the signals received from the access points.

According to a third embodiment, the first database (BDP) contains, for each access point, geographical position information including its geographical position and data describing a zone of uncertainty around said position.

The position of the terminal can then advantageously be determined by weighting the respective geographical positions of the access points detected by said terminal with weighting coefficients, said coefficients being obtained by an increasing function of the transmission powers of the points thus detected and a decreasing function of the surfaces of their respective zones of uncertainty.

The first database can be formed beforehand from a file providing, for each access point, its deployment mailing address, and each access point is assigned a geographical position from topographical information relative to said address stored in the second database.

The topographical information relative to said address preferably provides the two-dimensional footprint of the building located at that address and the position of the access point is then calculated as the barycenter of said footprint.

Alternatively, the topographical information relative to said address provides the two-dimensional footprint of the building located at said address and, if the building has several addresses $A_1, A_2, \ldots, A_K$ of respective geographical positions $P_1, P_2, \ldots, P_K$ the Voronoï diagram of the points located in those positions is determined, the geographical position of the access point being calculated as a barycenter of the intersection of said two-dimensional footprint with the Voronoï cell of the point associated with said address.

The first database can be formed from an initial set of access points, and an access point not belonging to said set can be identified and localized using signals received by at least three access points belonging to it, the identifier and the position of said access point then being stored in the first database.

In one embodiment, when the first estimate provides a positioning zone of a terminal that is unconnected or has a surface above a certain threshold, an estimation error is diagnosed.

In that case, it is possible to search among the access points taken into account in the first estimation step, the one having led to said error, and it is possible to remove it from the first database.

In one embodiment making it possible to improve the precision of the first database, one stores, in a centralized manner, the traces of a plurality of terminals, a trace of a terminal being defined as the set of identifiers for points detected in the first step during a particular period.

The second database advantageously defines a space for authorized positions as well as a space for positions prohibited for said plurality of terminals, the geographical positions of the access points are optimized inside their respective zones of uncertainty, the optimization being done by minimizing on average a cost function over all of the traces, said cost function depending on the deviation of a trace at the authorized positions space.

While the present invention is described herein in connection with certain embodiments, it is to be understood that the invention is not limited to the disclosed embodiments, but, on the contrary, is intended to cover various modifications and equivalent arrangements included within the spirit and scope of the appended claims, and equivalents thereof.

BRIEF DESCRIPTION OF THE DRAWINGS

Other features and advantages of the invention will appear upon reading preferred embodiments of the invention in reference to the attached figures, in which.

DETAILED DESCRIPTION OF CERTAIN EMBODIMENTS

We generally consider a given space in which at least one wireless telecommunications system network is deployed. Preferably, this network can be of the Wi-Fi type, i.e. according to one of standards 802.11 a/b/g/n, etc. Alternatively, it can be a WPAN (Wireless Personal Area Network) of the Bluetooth (IEEE 802.15.1, IEEE 802.15.2, IEEE 802.15.3, IEEE 802.15.4) or ZigBee (physical layers and MAC IEEE 802.15.4) type, a WMAN (Wireless Metropolitan Area Network) network of the WiMax (IEEE 802.16) type or a UWB network (IEEE 802.15.4a).

Several networks of the same type (for example depending on different operators) or of distinct types can also be considered in the context of the present invention. We assume hereafter, however, for simplification reasons and without prejudice of generalization, that the networks in question are of the Wi-Fi type.

As is known, a network of the Wi-Fi type includes access points installed in individuals' homes and/or in public spaces allowing a terminal having an IEEE 802.11 a/b/g/n modem to connect to the network. Such a terminal scans the terminals within its range, either automatically or upon a simple request. The scan can be done passively (reception of periodic message transmitted by the access points) or actively (transmission of a request message and reception of the response transmitted by the access point). It can thus obtain a list of surrounding access points with, for each one, its MAC address, also called BSSID (Basic Service Set Identifier), and, if applicable, an indication of the power level of the received signal or RSS (Received Signal Strength), independently of the fact that it may or may not connect to said point. In general, for any network, the terminal will be able to retrieve their respective identifiers from the signals received from the different access points. Identifier of an access point here will refer to an address bijectively associated with said point.

Figure 1:
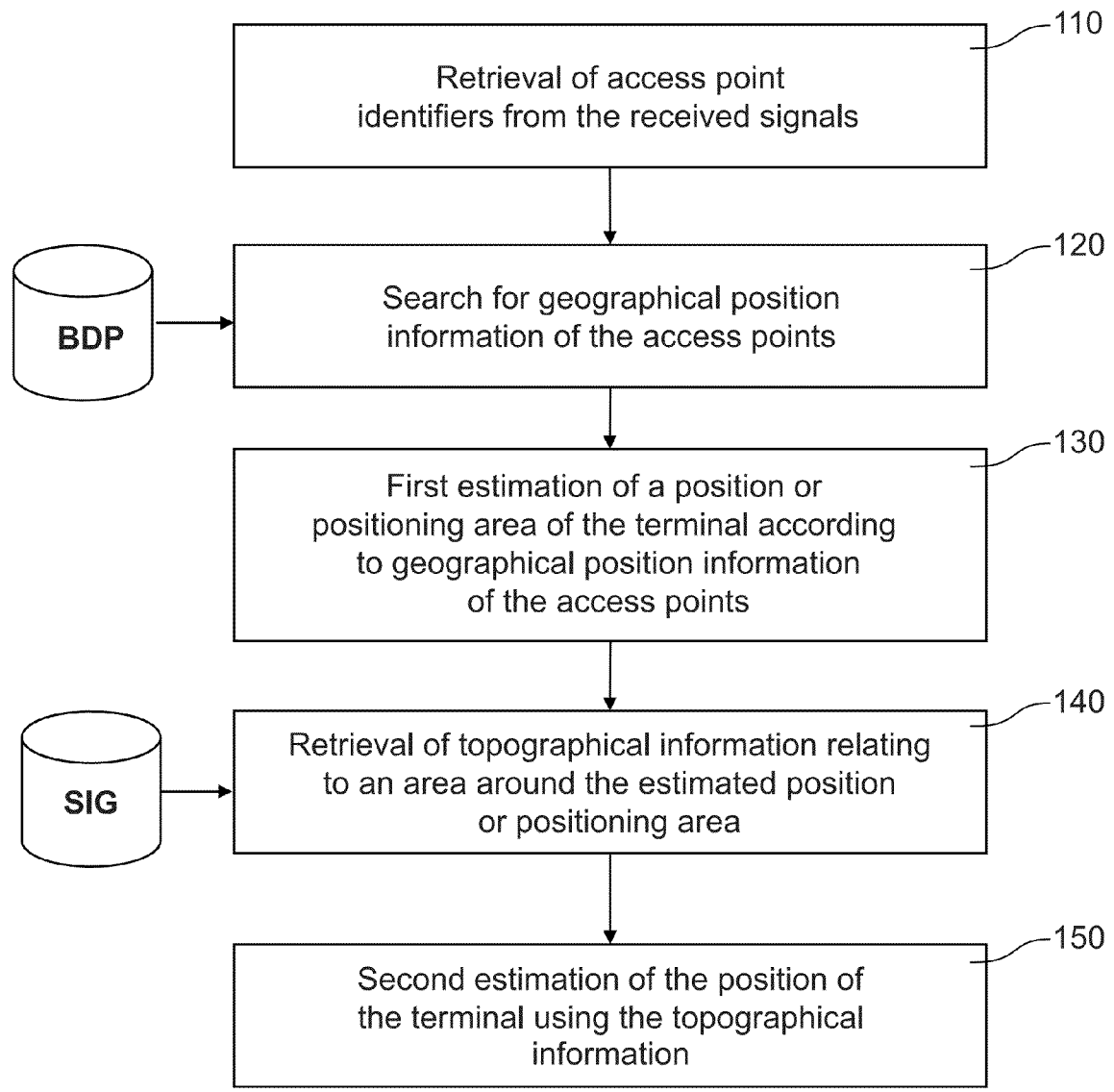
FIG. 1 diagrammatically illustrates the principle of the positioning method according to the invention.

FIG. 1 diagrammatically illustrates the principle of the positioning method according to the invention.

In a first step 110, as described above, the terminal scans the WLAN channels and retrieves the identifiers of the surrounding access points from the received signals. Optionally, it also measures the respective powers of the signals received (RSS) from said points.

In a second step 120, one searches in a database, denoted BDP, for position information relative to each of said terminals. The position information relative to a point can be reduced to its geographic position, for example the latitude and longitude of the site where it is located. It can alternatively represent, in more detail, the power distribution of the signal transmitted by the point, according to a predetermined mesh around it. In addition to the geographical position, the database BDP can comprise, for each point or only some of them, an indication of the power transmitted by said point and, if applicable, a propagation of the transmitted signal, shown for example in the form of propagation parameters. The manner in which the database BDP is formed will be described later.

This search for position information can be done by the terminal itself if the database BDP is stored locally or by a remote server housing the database.

In the first case, the database BDP can be located either in a memory of the terminal, or in a separate memory card. For example, the memory card can contain the database BDP relative to a given city. The database BDP can alternatively be downloaded completely or partially by the terminal. For example, if the user knows his itinerary, he can download on his terminal an excerpt from the database BDP corresponding to the anticipated itinerary. Alternatively, the terminal can send the server housing the database BDP a download request for part of said database, the request having for argument one or more identifiers of the detected points. The part of the BDP returned by the server to the terminal then covers a geographical zone determined by the server from a position deduced from the position of the identifiers sent into the request and a scope criterion that is predetermined or depends on a parameter of the request. Generally, the part of the BDP that must be returned to the terminal can also be determined using a coarse localization method.

In the second case, i.e. when the database BDP is located on the server, the terminal sends the latter a search request having for arguments the identifiers of the detected points. The server can then return the result of this search to the terminal.

If applicable, the database BDP can be distributed over several servers, for example of the SMLC (Serving Mobile Location Center) type as described in technical specification 3GPP TS 43.059 entitled "3GPP Technical Specifications Group ERAN; Functional Stage 2, description of Location Services (LCS) in GERAN" or of the GMLC (Gateway Mobile Location Center) type as described in technical specification 3GPP TS 23.271 entitled "3GPP Technical Specification Group Services and System Aspects; Functional Stage 2, description of Location Services (LCS)." The server can also be of the SLP type (SUPL Location Platform) as defined in document "Secure User Plane Location Architecture," Candidate version 1.0, 27 Jan. 2006, OMA-AD-SUPL-V1_0-20060127-C, Open Mobile Alliance.

The database BDP comprises at least one list of identifiers of the access points with their geographical information, for example their geographical positions. These identifiers can be grouped together by network or SSID (Service Set Identifier), or by geographical zones. When the database is stored in the terminal, it is advantageously compressed by a compression algorithm known in itself, for example Ziv-Lempel coding. Furthermore, one will advantageously use relative coding to code the geographical positions of the points, for example by choosing a reference at the center of the considered space.

In step 130, one performs a first estimation of a position information of the terminal. This information can provide the position of the terminal or a coarse indication thereof. The estimation can be done by the server or directly by the terminal, either because the database BDP is stored there, or because the geographical positions of the detected access points were transmitted to it beforehand by the server.

The estimation of the position of the terminal for example consists of determining the barycenter of a zone of uncertainty containing the access points whereof the received powers are above a certain threshold.

It can alternatively consist of calculating the barycenter of the geographical position of the access points, weighted by the received powers or by the indicators of said powers.

If the transmission powers of the access points are indicated in the database or if the nominal transmission powers are known for each network (i.e. for each SSID) or as a function of the type of terminal (given by the BSSID), the position of the terminal will be estimated as the barycenter of the geographical positions of the access points, weighted by the ratios of received power to the transmission power of each of these terminals or by weighting factors depending on these ratios.

In the more complex case where the database BDP contains the power distribution around each point, the position of the terminal is determined by minimizing a cost function depending on the deviation between the powers of the received signals and the stored powers. For example, the cost function can be the quadratic sum of these power deviations for the points detected by the terminal. The position of the terminal is then given by the point minimizing said cost function.

A hybrid situation is that where the database BDP contains the geographical positions of the access points and the parameters of a propagation model making it possible to calculate the power distribution around each point. It is then possible to determine the position of the terminal by using one or the other of the above methods.

As indicated above, the position information can simply provide a coarse indication of the terminal's position, i.e. a zone containing the position of the terminal, hereafter called positioning zone.

This positioning zone can be formed by the convex enclosure defined by the positions of all of the detected access points. Detected access point refers to a point for which the signal power received from the terminal is above a predetermined threshold.

According to a first alternative, the positioning zone can be formed by the union of the visibility zones relative to the detected points. Visibility zone of an access point refers to a zone in which a terminal can receive a signal with a power above a certain threshold (not necessarily identical to the aforementioned threshold). The visibility zone of each point can be either directly indicated in the database BDP, or deduced from a propagation model whereof the parameters have been previously stored in that database.

According to a second alternative, the positioning zone is defined as the intersection of the visibility zones relative to the points detected by the terminal. If this intersection is empty, the terminal can then opt for a positioning zone of the convex enclosure or union of visibility zones type.

According to a third alternative, the positioning zone is defined by a rectangular zone, defined in a local geographical reference or according to global coordinates in a referential that can be of the WGS84 type (latitude, longitude and optionally altitude) encompassing all of the positions of the detected access points.

The database BDP can be built so as to rank the positions of the access points by geographic slabs paving the considered zone. In that case, the positioning zone can be given by the union of the slabs each containing at least one of the detected access points, or if one wishes to have a more precise position estimation, by the intersection of said slabs.

It should be noted that the database BDP may contain errors, for example if the position of an access point has changed since the last database update. One may advantageously reject such an access point when it leads to a positioning zone with a surface that is too large or unconnected, or empty. In such a situation, one will for example reject the access point whereof the position is farthest from the barycenter of the detected access points.

The estimation of position information 130 can also take into account past position information, to reduce the error rate. For example, the position of the terminal may be obtained using filtering of the positions of the terminal estimated at consecutive moments. The filtering can be done using a recursive filter with a forgetting factor. Furthermore, one or more piece of past position information can have been obtained using another positioning method such as a satellite positioning method or by cell identification of a wireless telecommunications network.

Hereafter, APPS (Access Point Positioning System) refers to a system using positioning via access points, as in step 130, described above.

In step 140, one searches in a second database, denoted SIG, for topographical information related to a zone around the position of the terminal estimated in step 130 or the positioning zone of the terminal estimated in that same step.

The database SIG comprises a topographical model of that zone, i.e. a list of objects situated therein and ranked by categories. Each object is defined by attributive data, geometric data and geographical data. The geometric data describes the geometric shape of the object (a point, a segment, a set of segments, a polyhedron, etc.), the geographical data defines its geographical position. For example, the different considered categories can be roads, sidewalks, bridges, buildings, courtyards, parks, green spaces, forests, aquatic elements, points of interest (POI), etc. Each category can be subdivided into sub-categories. For example, the roads category is divided into highways, national roads, departmental roads, avenues, dead ends, pedestrian roads, railways, etc. The attributive data of an object comprises, inter alia, the category and the sub-category to which it belongs.

An object can also be defined in the SIG database by the additional data such as the name of a road segment, the address of a building, etc.

Using topographical information for the zone in question, the terminal or, if applicable, the remote server proceeds with a new estimate of its position.

According to a first embodiment of the invention, the topographical information from the database SIG is used to select the most appropriate positioning method from among: an access point positioning method (APPS), a satellite positioning system (SPS), or a hybrid positioning method, the latter itself being able to be broken down in the form of a so-called tight hybridization, i.e. occurring at the exploitation of the received signals (SPS and APPS) or a so-called loose hybridization, i.e. occurring at the positions obtained by said two methods. In the case where a hybrid positioning method is chosen, the topographical information from the database SIG is used to adjust the weighting coefficients applied to the positions obtained by the SPS and APPS methods in the case of loose hybridization, or applied to the measurements done using the SPS and APPS methods in the context of tight hybridization.

The selection can be done according to different criteria considered alone or in combination.

A first criterion is the "clear" or non-clear nature of the considered zone. For example, if this zone corresponds to an avenue portion, a square, a park, the satellite positioning system will be preferable. Conversely, if the zone corresponds to a street and a fortiori if the adjacent buildings are tall, the APPS positioning system will be preferred. The selection will for example be done from the aforementioned attributive data. The orientation of the streets can also be a component element of this first criterion, the performance of the SPS system being statistically more or less high according to said orientation. If one predicts poor localization performance given the orientation of the street and the satellite configuration, one will opt for the APPS positioning system.

A second criterion is the number of satellites seen in a direct line or LOS (Line Of Sight) by the terminal at the time of the estimation. To determine whether a satellite is occulted, one uses the geometric data for the buildings around the first estimated position, a table of descriptive parameters of the orbits (ephemerides, almanacs) of the satellite system and date information. If the number of satellites in the LOS is below a given threshold, one will opt for APPS positioning. If necessary, one may use a hybrid positioning method and assign a higher weight to the APPS positioning when the number of satellites in the LOS is below a given threshold.

A third criterion is that of the geometric dilution or GDOP (Geometric Dilution Of Precision) relative to the satellites in the direct line of sight of the terminal. One will recall that this geometric dilution is low in a configuration where the satellites have angular positions remote from one another and conversely, it is high in a configuration where the satellites have close angular positions. To calculate the value of GDOP, one uses a table of descriptive parameters of the orbits (ephemerides, almanacs) of the satellite system and date information. It is also possible to exclude from calculation the satellites having been declared not visible in a line of sight. If the geometric dilution lies above a predetermined threshold, it will be preferable to use APPS positioning.

A fourth criterion is the profile of the propagation channels between the access points and the terminal. Given the respective positions thereof and the estimated position of the latter, one uses topographical modeling of the zone to predict the propagation characteristics of the different channels. It is for example possible to predict whether a channel is of the multi-path or single-path type, or the value of the attenuation coefficient of a path/channel or the variance of the spatial distribution of power for at least one of the detected points. If these channels have unfavorable characteristics (multi-path, high attenuation, high variance), the satellite or hybrid positioning system will be preferable.

A fifth criterion is that of the angular distribution of the access points in the line of sight of the terminal. It will in fact be understood that the precision of the positioning using the access points will be better inasmuch as they have angular positions remote from each other. If the precision is sufficient, the APPS positioning system is selected.

A sixth criterion not using the topographical information of the database SIG can be combined with the preceding ones, i.e. that of the density of access points in the zone in question. This density is simply calculated from coordinates of the access points and limits of the zone, for example by determining, for each point of the database BDP, whether its latitude and longitude are respectively comprised in intervals that define the limits thereof. If the access point density is above a first threshold, the APPS positioning method is used. If it is below a second threshold, the SPS positioning method is used. If it is comprised between the first and second thresholds, a hybrid positioning method is used. It will be noted that these calculations can be done once for all or upon each update of the database BDP. In this case, the results of the calculations can be stored in the database SIG, in the form of positioning zones (category), belonging to three sub-categories: satellite positioning zone, access point positioning zone, hybrid positioning zone. In the latter case, the loose or tight hybridization type may also be specified.

Lastly, the selected positioning method can be distinct along different axes. More specifically, if the terminal is at an intersection between two streets and if one of them has a high point density while the other has a low one but, on the other hand, offers good visibility of numerous satellites with a low elevation, the algorithm for calculating the position can be split into two independent sub-algorithms respectively corresponding to the calculation of the position along the axis of the first street and the axis of the second street, the first using the signals transmitted by the access points and the second the satellite signals. This breakdown into two positioning algorithms of different types can also be applied to zones such as large avenues, the position along the longitudinal axis of the avenue then being determined by an algorithm of a first type and the position along its transverse axis being determined by an algorithm of a second type.

According to an alternative of the first embodiment, the selection of the positioning method is used to reduce the electrical consumption of the terminal. More specifically, if the positioning method by access points is selected, the software and material means specific to satellite positioning (for example the GPS receiver) are put on standby, only the information necessary for a quick restart if needed advantageously being stored in memory. Reciprocally, if the satellite positioning method is selected, the software and material resources specific to access point positioning are put on standby. Once the selection criterion is no longer met, these means are reactivated. If necessary, the standby means can be periodically reactivated to verify whether the selection criterion is still met. The activation period is advantageously a decreasing function of the travel speed of the terminal.

According to a second embodiment of the invention, the topographical information stored in the database SIG is used to determine the characteristics of the channel between each detected access point and the terminal, in particular the propagation coefficients and the delay times of the different paths. These characteristics make it possible to calculate the theoretical power that the terminal should receive at different points of the zone around its estimated position. Advantageously, this zone is meshed and a cost function depending on the deviations between received power and calculated power, for the different access points detected by the terminal, is minimized on the nodes of the mesh. For example, the cost function will be defined by a quadratic sum of said deviations. The second estimation of the position of the terminal is finally given by the position of the node minimizing said cost function.

According to a third embodiment, the geographical positions of the different access points determined by the terminal are assigned uncertainty zone, determined as described in detail later. The geographical information of the database BDP then comprises, for each access point, its geographical position and the data defining the uncertainty zone for that position.

When the position of the terminal is determined by a barycentric calculation (received power, ratios between transmitted and received power), the weight coefficients can be modified by a corrective factor taking into account the size of the uncertainty zone. More specifically, the weight coefficient relative to an access point whereof the uncertainty zone is significant will be increased and that relative to an access point with a low uncertainty zone will be decreased in return. As a general rule, the weight coefficients will be defined by an increasing function of the transmission powers of the points and a decreasing function of the respective surfaces of their uncertainty zones.

Likewise, when the position is calculated by using a cost function, the coefficient weighting the quadratic deviation between received and calculated powers may be upwardly or downwardly corrected depending on whether the surface of the uncertainty zone of the access point is low or high.

According to a fourth embodiment of the invention, the topographical data of the database SIG make it possible to determine the zones that are accessible or inaccessible to the user of the terminal. Accessible (or authorized) zone refers to a zone where a user may be physically located. Failing this, the zone is inaccessible (or prohibited).

If the position estimated in step 130 falls in an authorized zone, this position remains unchanged. However, if it falls into an unauthorized zone, the point corresponding to that position is projected into the space of the authorized positions. In other words, the second position estimation is given by the coordinates of the authorized point closest to the unauthorized point.

According to one alternative, the user may advantageously declare his mode of travel: automobile, pedestrian, bicycle, train, etc. For each mode of travel, the database SIG will provide the zones that are accessible or inaccessible to the user. For example in the automobile mode of travel, the two-dimensional footprints of the buildings will be considered prohibited, in a rail travel mode only the railroad tracks are authorized.

Below we will describe how the database BDP can be formed and/or updated.

According to a first variant, the database BDP is formed beforehand by files from the operators providing the deployment address for each access point. In general, each operator has a file in which the names and mailing addresses of clients, also called deployment addresses, are listed, as well as the characteristics of the equipment installed at each of the addresses, in particular the identifier (for example the MAC address or the BSSID) of an access point when it is present.

If the database SIG contains the addresses of buildings (additional data), it is possible to associate a geographical position with each deployment address, as will be seen later. One then obtains for each network a list of identifiers of access points with their respective geographical positions, in other words the information making up the database BDP.

According to the type of representation of the mailing addresses in the database, the calculation of the geographical position of an access point can differ.

Figure 2A:
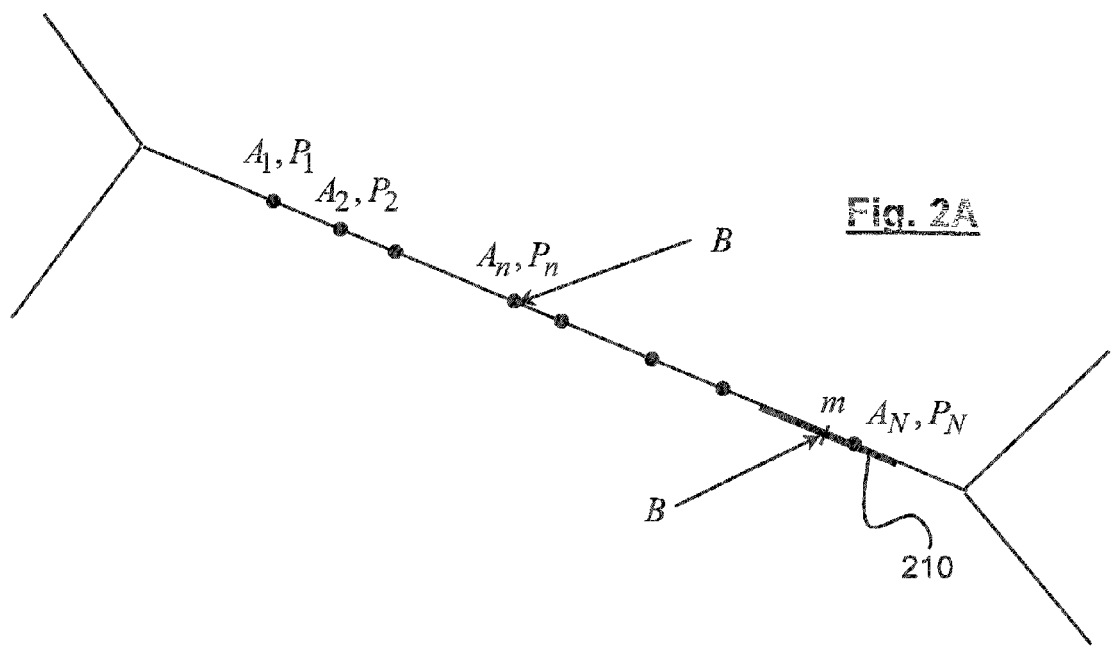
FIGS. 2A and 2B respectively illustrate one-dimensional and two-dimensional examples in the topographical database.

If the addresses are shown by simple points along a roadway, as illustrated in FIG. 2A, the geographical position of the point is simply that of the point in question. If the address is missing, it is advantageously determined by interpolation between consecutive addresses on a same side of the road (for example even or odd), on the condition, however, that these belong to a same road segment.

If the buildings are shown one-dimensionally along the roadway, the geographical position of the point will be defined as the middle of the segment representing the building.

Advantageously, a position uncertainty zone is determined for each access point. In the first aforementioned type of representation, the uncertainty zone is determined as the road segment whereof the ends are given by the address that precedes and the address that follows the deployment address of the point, on the same side of the road. In the second aforementioned type of representation, the uncertainty zone is simply determined by the segment showing the building.

Figure 2B:
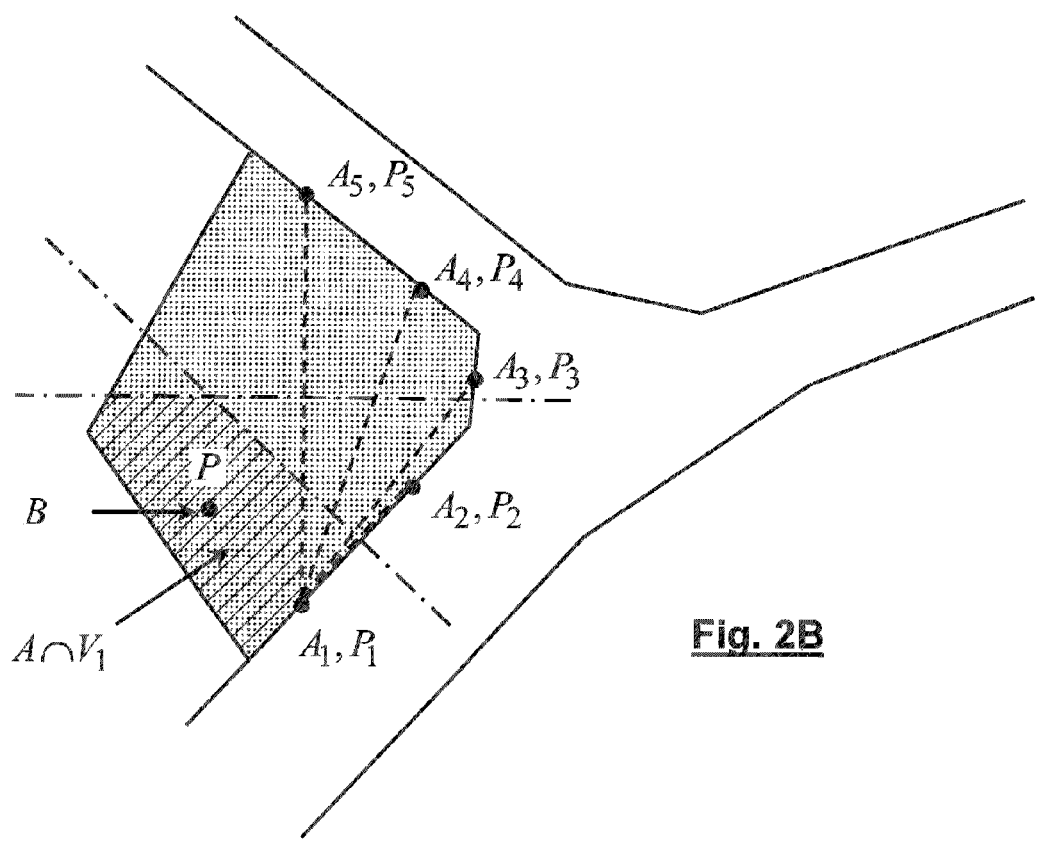

If the buildings are shown two-dimensionally in the database SIG, as illustrated in FIG. 2B, the position of the access point can be calculated as the barycenter of the two-dimensional footprint of the building at the deployment address. The uncertainty zone is then determined correlatively by the polygon defining the two-dimensional footprint A of the building (shown grayed out in FIG. 2B). Advantageously, this uncertainty zone can be reduced when the building has several addresses $A_1, A_2, \ldots, A_K$ associated with the respective geographic positions $P_1, P_2, \ldots, P_K$. In this case, the uncertainty zone associated with a point having address $A_k$ is defined as the intersection between the two-dimensional footprint A and the Voronoi region $V_k$ of the point $P_k$. This reduced uncertainty zone has been shown cross-hatched in FIG. 2B. The position P of the access point can then be calculated as the barycenter of the zone $A \cap V_k$.

If the buildings are shown three-dimensionally in the database SIG, the uncertainty zone can be defined by the polyhedron with base A and a height equal to the maximum height or even the average height of the building if that information is indicated in SIG. Alternatively, the uncertainty zone can be defined by the polyhedron with base $A \cap V_k$ and the height of which is equal to the maximum or average height of the building. Lastly, if the floor numbers are indicated in the database SIG, it may also be possible to reduce the size of the uncertainty zone while only considering the horizontal section of the polyhedron corresponding to that floor. This assumes, however, that the height of the floors or that the number of floors as well as the height of the building are also indicated in the database SIG.

A recording is thus created for each access point comprising its identifier, its geographical position and, if applicable, the associated uncertainty zone. This recording can also comprise other characteristics of the access point, retrieved from the file of the telecommunications operator, in particular its transmission power, radiation diagram, frequency band used, etc.

After having been formed, the database BDP can be updated as changes are made to the files of the operators.

According to a second variant, alternative or complementary to the first, the database BDP can be formed, enriched or updated using a declaration procedure. More specifically, this procedure allows any person hosting an access point to voluntarily declare on a Web portal (for example managed by the APPS service) his mailing address and the characteristics of the point(s) he hosts.

The geographical positions and the uncertainty zones can then be determined as before. Alternatively or cumulatively, the client can specify on the portal in question the geographical position of his access point(s). To that end, an excerpt from the database SIG can be displayed on his screen in the form of a geographical map, if applicable centered on his address if the client has previously provided it. The client then needs only click on the specific geographical position of the terminal(s), relative to their identifiers. Alternatively, the geographical position of a point can be determined by scanning the surrounding points. If at least three of them are already declared, the position of the point may be obtained in the form of a barycenter of their respective positions, as previously explained for a terminal.

The characteristics of the terminal can be entered either manually by the client, or automatically, from a scan done by the modem of the computer. In the latter case, the client then needs only select, in the list of detected points, that or those situated near him. The identifier and, if applicable, other characteristics of the selected point is (are) then detected directly by the modem. At each selected point, the portal can propose to the client to specify his geographical position on a map.

The database BDP can be enriched gradually from an initial set of access points. In fact, these points can identify and localize the surrounding points belonging or not belonging to the same network. To that end, it suffices for three access points of the initial or enriched set to be able to identify and measure the powers of the received signals (RSS) of that point. The new identified and localized point is then incorporated into the database.

In any case, the precision of the database BDP thus formed can then be improved as described below.

It is assumed, in this embodiment, that the database BDP is hosted by a server and that the latter stores, in a centralized manner, the traces of the users of the positioning system. The trace of a user (or a terminal) here refers to all of the identifiers of the detected access points, and advantageously their RSS as well as time information associated with each detection/measurement. This data can be accompanied by the geographical positions taken by said user during a given period, as they were estimated by the positioning system. Failing this, these positions can be recalculated by the server.

One also assumes that information has been provided, either implicitly or explicitly, on the authorized/prohibited zones in the database SIG, if applicable according to the travel mode used.

It will lastly be assumed that the estimated geographical positions have not been subject to a projection in the authorized zone space. Failing this, one will only take into account the traces or trace portions not having been the subject of such processing.

The improvement to the precision is obtained by looking within the uncertainty zones for the positions of the points that minimize, on average, a cost function over all of the available traces. Preferably, this cost function measures, for each trace, the deviation at the space of the authorized points, taking into account, if applicable, the selected travel mode. In other words, one tests whether a change in the positions of the access points within their respective uncertainty zones leads to included traces or, failing that, closer to the space of the authorized points. For example, one tests whether such a modification makes it possible to obtain traces comprised within road zones when they relate to automobile travel.

The precision improvement can also consist of eliminating one or more points from the database BDP if the elimination of these points leads, over a representative number of traces, to a minimum significantly lower than the cost function. This makes it possible in particular to eliminate from the database BDP the points whereof the position has changed since the last update.

Improved precision can also be obtained, alternatively or in combination with the preceding methods, by minimizing the cost function by seeking to adjust the individual propagation parameters of the access points or the predicted power values on a meshing of the space in the database BDP.

To simplify the optimization process, one may be satisfied with a local optimization and do it gradually. The local optimization consists of taking the traces into account only inside a limited zone and only looking for the optimal positions for points participating in the calculation of the traces in question. For example, one may take into account only traces inside or close to a circulation path and, correlatively, only the access points adjacent to said path.

It will also be noted that if a trace portion has been determined exclusively using a satellite position (without hybridization), this position will be considered invariable and may therefore come from the calculation of the cost function.

The optimization itself can be done according to an algorithm that is known in itself, for example using a simulated annealing method, a gradient-descent method, a stochastic gradient-descent method, etc.

The optimization of the positions of the access points can be done in several successive posses, if applicable by starting with a local optimization pass and ending with a global optimization pass.

It may be done once and for all when a sufficient trace density has been obtained. Preferably, it is done at regular intervals, so as to take into account one possible evolution of the position of the points. In that case, the optimization may only pertain to the most recent traces or take into account traces with different dates by weighting them using forgetting coefficients.

The cost function indicated above measures the deviation between a trace and the space of the authorized points. It can also take other geometric, kinetic, etc. constraints into account.

Figure 3:
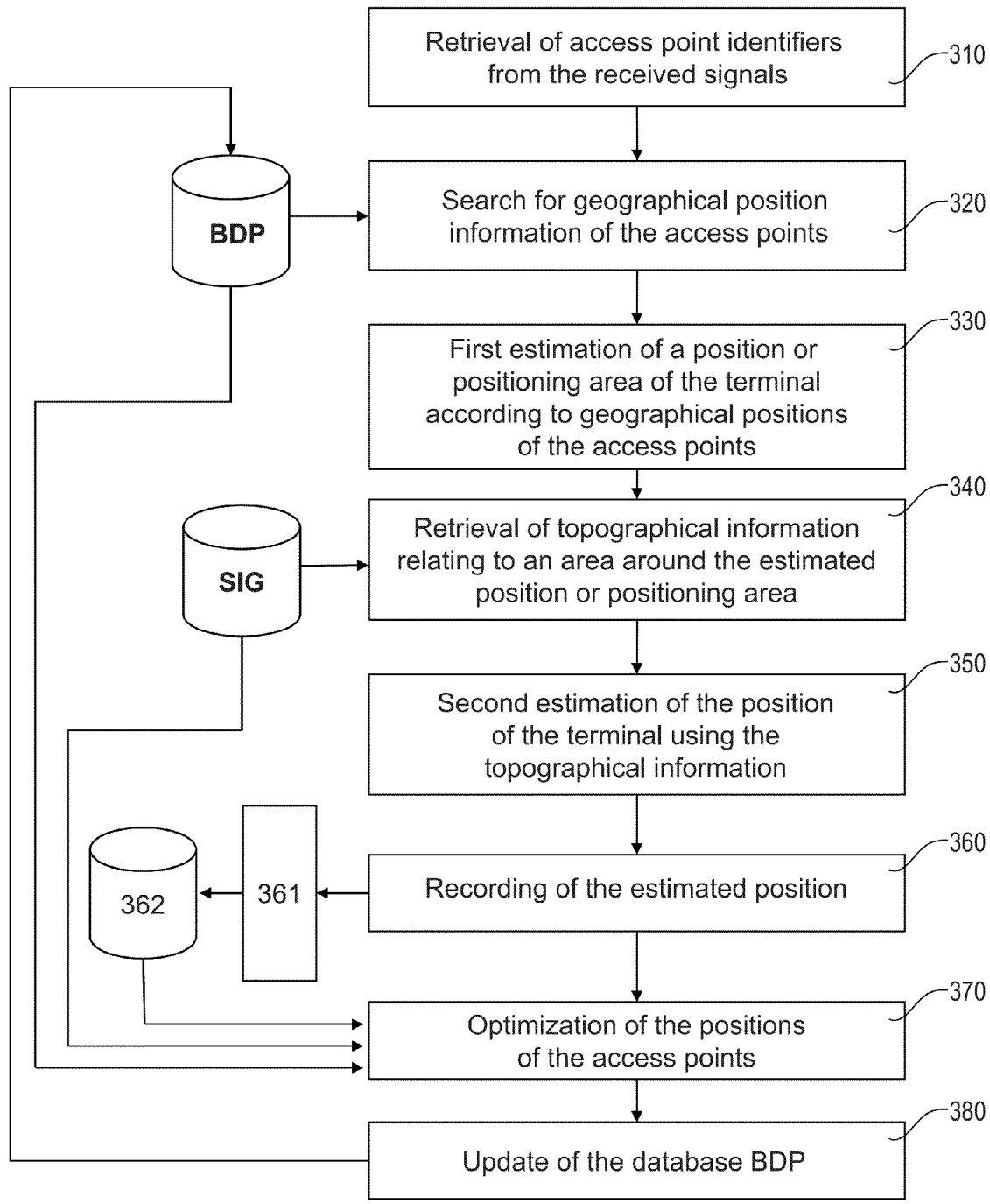
FIG. 3 diagrammatically illustrates a positioning method with improved precision of the positions of the access points.

FIG. 3 diagrammatically illustrates a positioning method according to one embodiment of the invention, in which the precision of the database BDP is improved.

Steps 310 to 350 are identical to steps 110 to 150 of FIG. 1 and they will therefore not be described again here. In step 360, the estimated position is stored in a buffer memory 361 of the terminal or the server depending on whether the calculation of the position of the terminal is done by one or the other. The content of the buffer memory is transferred at regular intervals to a trace memory. It will be noted that the buffer memory is optional inasmuch as the successive positions of the terminal can be transmitted to the server and stored in its auxiliary storage upon each estimation.

Advantageously, for each trace the following information is recorded:
the selected type of movement (optional)
the date of the trace (optional)
the identifiers of the access points having served for positioning and for each of these terminals:
the RSS measurements done on the different detected points (optional)
the moments at which the access points were detected and their RSSs measured (optional)
the estimated geographic positions (in step 350) (optional)
the positioning type (APPS, SPS, hybrid and, if applicable, the type of hybridization) (optional).

When a certain number of traces or new traces (from the last operation) have been collected in the memory 362, the positions of the access terminals are optimized in step 370 as previously described. This step requires access to the database BDP (initial positions of the points, uncertainty zones of the points), the database SIG (authorized points space) as well as the trace memory 362.

The database BDP is then updated in step 380.

What is claimed is:

1. A method for positioning a terminal using signals received from a plurality of access points of at least one wireless telecommunications network, the method comprising:
retrieving identifiers of the access points from the received signals;
searching in a first database (BDP) for geographical information for the access points based on their respective identifiers, the geographical information enabling a prediction of power values of the received signals on a meshing of a space;
estimating position information of the terminal within the space, based at least in part on the geographical information of the access points, the estimated position information corresponding to an estimated position of the terminal or information regarding an estimated positioning zone in which the terminal is located;
retrieving, from a second database (SIG), topographical information corresponding to a zone around the estimated position, or the estimated positioning zone, the second database further defining a space of authorized positions as well as a space of prohibited positions for terminals; and
estimating the position of the terminal based on the retrieved topographical information,
wherein the positioning method is carried out for a plurality of terminals and further comprises:
storing traces of the plurality of terminals in a centralized memory, where a trace of a terminal is defined as a set of identifiers retrieved for estimated positions of the terminal during a particular period; and
optimizing geographical information of the access points, by minimizing on average a cost function over all of the traces of the plurality of terminals.

2. The positioning method according to claim 1, wherein geographical information, of the access points includes zones of uncertainty around respective positions of the access points.

3. The positioning method according to claim 2, wherein the optimizing geographical information, of the access points
comprises optimizing the positions of the access points within their respective zones of uncertainty.

4. The positioning method according to claim 3, wherein the cost function measures, for each trace, the deviation with respect to the space of the authorized positions for terminals.

5. The positioning method according to claim 4, wherein the deviation thus measured by the cost function depends on a selected travel mode.

6. The positioning method according to claim 1, wherein for each trace of a terminal the date of the trace is recorded in the centralized memory.

7. The positioning method according claim 1, wherein, for each trace of a terminal, measurement of strengths of signals received from the access points are stored.

8. The positioning method according to claim 1, wherein the terminal determines, based on the retrieved topographical information, characteristics of the propagation channels between the detected access points and a plurality of points of the meshing, and deduces therefrom, for each of the plurality of points, predicted power at each of the plurality of points.

9. The positioning method according to claim 8, wherein the estimating the position of the terminal estimates the position of the terminal by searching, among the plurality of points, for one point that minimizes a second cost function depending on the gap between the predicted power at one point and the powers of the signals received from the access points.

10. The positioning method according to claim 2, wherein the position of the terminal is determined from weighting of the respective positions of the access points detected by the terminal using weighting coefficients, the weighting coefficients being obtained based on an increasing function of the transmission powers of detected access points and a decreasing function of the surfaces of the respective zones of uncertainty corresponding to the detected access points.

11. The positioning method according to claim 1, wherein the first database is formed from an initial set of access points, and an access point not belonging to the set can be identified and localized using signals received by at least three access points belonging to the set, the method further comprising storing the identifier and the position of the access point in the first database.

* * * * *